April 9, 1935.  E. J. SILVEIRA  1,996,935
ICE CREAM TRAY
Filed Sept. 12, 1932
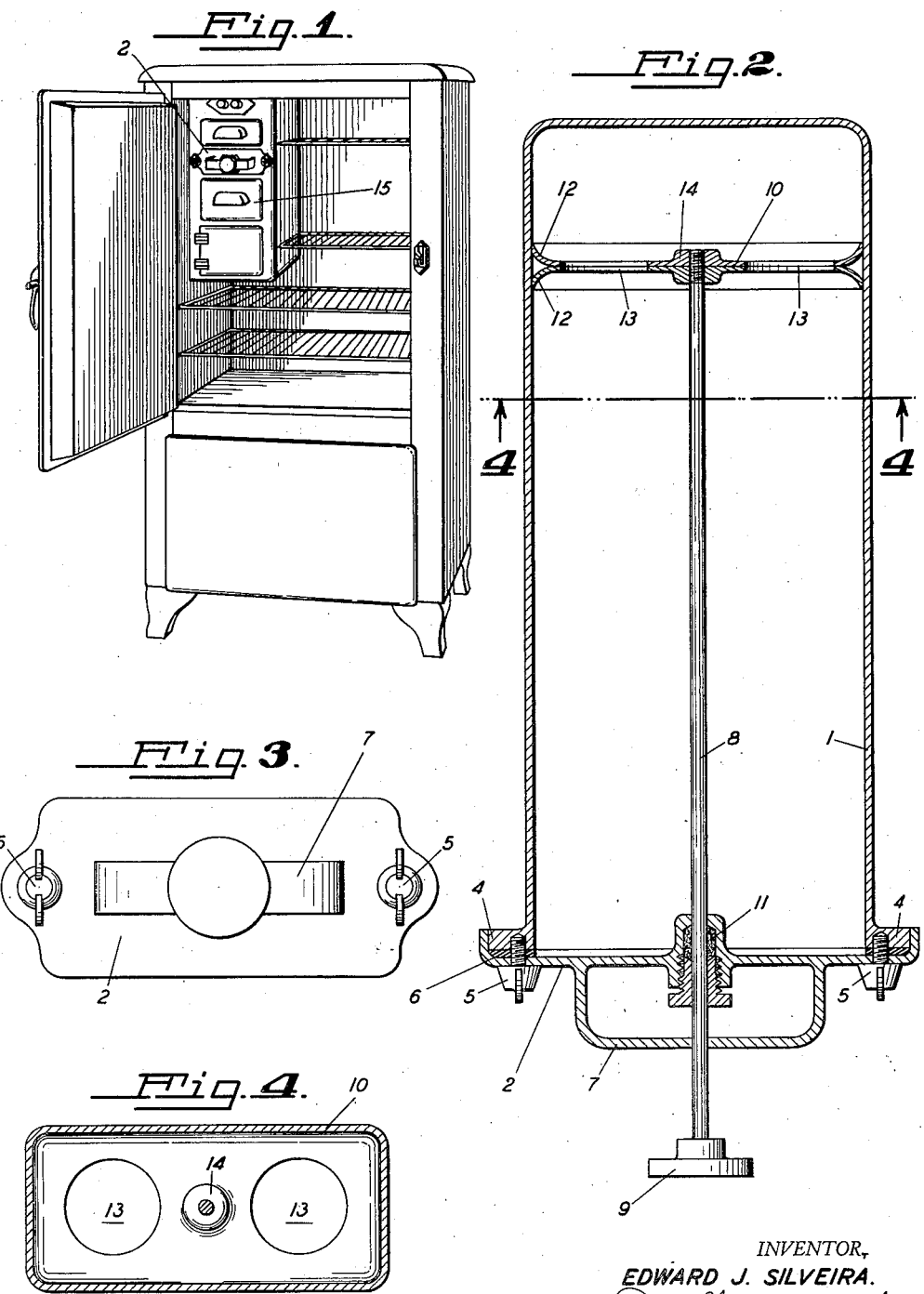
INVENTOR,
EDWARD J. SILVEIRA.
BY
ATTORNEY Patented Apr. 9, 1935

1,996,935

UNITED STATES PATENT OFFICE 1,996,935

ICE CREAM TRAY

Edward J. Silveira, Walnut Creek, Calif., assignor of one-half to Donald K. Lippincott, Larkspur, Calif.

Application September 12, 1932, Serial No. 632,654

3 Claims. (Cl. 259—113)

My invention relates to an ice cream tray, and more particularly to a tray which can be inserted in a freezing compartment of a household refrigerator, and in which the contents may be agitated or stirred to prevent large grain formation during the freezing process.

Among the objects of my invention are: To provide a simple device for making ice cream in a household refrigerator; to provide a sealed tray for a household refrigerator in which the contents may be stirred to prevent large grain formation; to provide a sealed tray for insertion into an ice cube compartment of a household refrigerator, the tray being provided with an inside dasher operable from the outside of the tray; to provide a stirring mechanism for an ice cream tray adapted to be inserted into a freezing compartment of a household refrigerator; and to provide a simple and inexpensive means of making smooth and grainless ice cream in a household refrigerator.

Other objects of my invention will be apparent or will be specifically pointed out in the description forming a part of this specification, but I do not limit myself to the embodiment of my invention herein described, as various forms may be adopted within the scope of the claims.

Since the advent of the compact household refrigerator, in which freezing compartments are provided, frozen desserts have been popular, as they may be easily made in the trays ordinarily used for the freezing of ice cubes. Such desserts, however, are either in the form of mousses, or sherbets, in which the formation of large ice crystals is not highly objectionable.

Smooth and grainless ice cream can only be made in the above manner by continually removing the tray, and stirring or agitating the contents while freezing, with a spoon or similar utensil. Even then the resultant dessert is not like churned ice cream as commonly sold, as the crystals are not thoroughly broken up or retarded during formation, and the cream will still have a grainy consistency.

In broad terms, my invention comprises a tray in which the unfrozen cream may be placed, and sealed in with a tight cover. Agitating means are provided inside the tray, and the agitating device may be operated from outside the tray while the tray remains in place in the freezing compartment. I also prefer to make my tray of the proper shape and dimensions as the common ice cube trays ordinarily used in the freezing compartments of household refrigerators.

In the drawing, which shows one preferred form of my ice cream tray:

Figure 1 is a view in perspective taken from the front of a household refrigerator showing the ice cream tray in place.

Figure 2 is a longitudinal sectional view of a tray.

Figure 3 is a view in elevation of the cover plate.

Figure 4 is a view in elevation of a dasher.

Referring to Figure 2, a tray body 1 is drawn or otherwise formed from aluminum, Monel metal or other non-corrosive metal, in the shape of a long deep container adapted to fit a freezing compartment in a household refrigerator. While I have shown the tray provided with an end cover 2, it is obvious that a longitudinal cover may be employed if desired.

The open end 3 of the tray body is provided with lateral lugs 4—4 which are threaded to receive thumbscrews 5—5, which pass through the cover opposite the lugs and which serve to secure the cover to the body. It is desirable to include a gasket 6 between the cover and the tray body, so that a leak-proof seal is made when the thumbscrews are tightened.

The cover is formed with a handle 7, as the trays when inserted and after being frozen are often hard to remove, due to minute amounts of ice bonding the trays to the freezing compartment.

Passing through the center of the handle 7 and the cover 2 is an actuating rod 8, supplied at its outer extremity with an actuating knob 9 and fastened to a dasher 10 inside the tray. Where the rod passes through the cover-wall I have provided a stuffing box 11 to prevent leakage of the contents.

The dasher, shown in Figure 4, is preferably formed from two pieces of metal 12 of like shape, placed back-to-back. These pieces of metal are just enough smaller than the interior of the tray so that the dasher may pass freely from one end to the other, and are slightly rounded in contour near their outer edges. Holes 13 are cut in the dasher for passage of the cream.

The rod 8 is screwed into a dasher insertion 14 in the center of the dasher, the dasher insertion lining up with the stuffing box 11.

The tray is then ready to operate. An unfrozen ice cream mixture is placed in the tray, the cover and the dasher mechanism inserted, and the cover is locked on by the thumbnuts. An ice cube tray is removed from its compartment in a household refrigerator and the above described, filled ice cream tray, is inserted, as shown in Figure 1.

The door to the refrigerator is closed and the contents of the tray start to freeze.

Freezing of the tray contents starts all around the inner surface of the tray, and ice crystals start to form in the cream. After a time dependent on the freezing speed of the individual refrigerator, the door is opened, and, without disturbing the tray, a few full length strokes of the dasher are made, using the actuator knob 9. The door is closed, and the process repeated until the dasher can only be moved with difficulty. The ice cream is then frozen and may be removed at once, or left to further solidify if desired, but in any case, the resultant cream will be smooth and free from grain or ice crystals. The more often the dasher is moved, the finer the texture will be.

As the dasher passes from end to end of the tray, when the knob is pulled or pushed, the entire content of the tray is agitated. In addition the dasher, being nearly the size of the interior, scrapes the quickly frozen portion from the walls, and mixes it thoroughly in the unfrozen portion. New portions of the unfrozen mixture contact the walls and start to freeze.

The holes in the dasher allow the material to flow from one side of the dasher to the other during movement, and aid in the efficient mixing of the frozen material scraped off the walls, with the unfrozen material in the center, thereby promoting fast freezing.

I have found that ice cream comparable to the best produced in special apparatus may be easily and quickly made in the ordinary household refrigerator provided with trays as above described.

It sometimes happens that some refrigerators are equipped with double trays, that is, double the height of the usual tray. One such tray is indicated by the numeral 15 in Figure 1. The same device as described may be applied to such double trays, or some modification which will efficiently agitate larger amounts of cream.

I claim:

1. Means for making ice cream in the expansion chamber of a household refrigerator comprising the combination of a tray adapted to contain a material to be frozen and fitting into said expansion chamber, a cover for said tray, a dasher assembly comprising a pair of plates of like shape placed back-to-back, each plate having a pair of large apertures, said apertures having an area sufficiently less than the cross sectional area of said dasher so that the velocity of the material passing therethrough is materially greater than the velocity of said dasher when moved therein and a peripheral out-turned lip contacting the walls of said tray, and an operating rod separably connected to each of said plates and holding them together, said rod being operable through said cover for moving said dasher back and forth within said tray.

2. Means for making ice cream in the expansion chamber of a household refrigerator comprising the combination of a tray adapted to contain a material to be frozen and fitting into said expansion chamber, a cover for said tray, a dasher assembly comprising a pair of plates of like shape placed back-to-back, each plate having a pair of large apertures, said apertures having an area sufficiently less than the cross sectional area of said dasher so that the velocity of the material passing therethrough is materially greater than the velocity of said dasher when moved therein and a peripheral out-turned lip contacting the walls of said tray, an operating rod extending through said cover, and means positioned between said apertures to separably attach each of said plates to the end of said operating rod and to maintain said plates in back-to-back relation.

3. Means for making ice cream in the expansion chamber of a household refrigerator consisting of a container for holding a quantity of fluid to be frozen and adapted to be hermetically sealed, said container being proportioned to fit into said expansion chamber, a dasher reciprocally movable within said container in fixed relationship axially thereto consisting of a plate completely filling the cross sectional area of the interior of the container and having turned edges for scraping frozen portions of the fluid from the sides thereof and directing said frozen portions toward the center of the plate, said dasher having apertures therein for permitting passage of said fluid from one side of the dasher to the other side thereof at a velocity greater than the velocity of movement of the dasher, and means connected with said dasher and extending outside of said container for moving said dasher.

EDWARD J. SILVEIRA.